(12) United States Patent
Fahlgren et al.

(10) Patent No.: US 12,483,654 B2
(45) Date of Patent: *Nov. 25, 2025

(54) SYSTEM AND METHOD FOR QUEUING A COMMUNICATION SESSION

(71) Applicant: Twilio Inc., San Francisco, CA (US)

(72) Inventors: Christer Jan Erik Fahlgren, San Francisco, CA (US); John Wolthuis, San Francisco, CA (US); Peter Shafton, San Francisco, CA (US); Thomas Schiavone, San Francisco, CA (US)

(73) Assignee: Twilio Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/658,217

(22) Filed: May 8, 2024

(65) Prior Publication Data

US 2024/0291919 A1    Aug. 29, 2024

Related U.S. Application Data

(63) Continuation of application No. 18/075,985, filed on Dec. 6, 2022, now Pat. No. 11,991,312, which is a
(Continued)

(51) Int. Cl.
*H04M 3/51* (2006.01)
*H04M 3/00* (2024.01)
(Continued)

(52) U.S. Cl.
CPC .......... *H04M 3/523* (2013.01); *H04M 3/5141* (2013.01); *H04M 2203/407* (2013.01)

(58) Field of Classification Search
CPC ...... H04M 3/5238; H04M 3/523; H04M 3/51; H04M 3/5166; H04M 3/5183; H04M 3/5232; H04M 3/42059; H04M 3/493; H04M 3/5175; H04M 3/5191; H04M 3/5233; H04M 3/4286; H04L 67/10; H04L 67/141; H04L 67/306; H04L 63/10; H04L 67/02; H04L 61/308; H04L 67/32; H04L 41/5096; H04L 45/44; H04L 47/762; H04L 47/822; G06F 9/547; G06F 17/30522;
(Continued)

(56) References Cited

U.S. PATENT DOCUMENTS 6,820,260 B1 * 11/2004 Flockhart .............. H04L 65/401
717/172
8,233,611 B1 * 7/2012 Zettner ............... H04M 3/5231
379/210.01
(Continued)

*Primary Examiner* — Kharye Pope
(74) *Attorney, Agent, or Firm* — Schwegman Lundberg & Woessner, P.A.

(57) ABSTRACT

A system and method including receiving a request to enqueue a communication session; adding the communication session to the queue of a plurality of communication sessions; upon adding the communication to the queue,
(Continued)

transferring control logic to the configured wait-state application; receiving a dequeue request initiated by a second entity; in response to the dequeue request, managing the procession of communication sessions in the queue; and dequeuing a communication session from the queue.

20 Claims, 11 Drawing Sheets

Related U.S. Application Data continuation of application No. 16/413,991, filed on May 16, 2019, now Pat. No. 11,546,471, which is a continuation of application No. 14/966,987, filed on Dec. 11, 2015, now Pat. No. 10,320,983, which is a continuation of application No. 13/921,941, filed on Jun. 19, 2013, now Pat. No. 9,247,062.

(60) Provisional application No. 61/661,730, filed on Jun. 19, 2012.

(51) Int. Cl.
*H04M 3/523* (2006.01)
*H04M 5/00* (2006.01)
*H04L 12/66* (2006.01)

(58) Field of Classification Search
CPC ....... G06F 17/30867; G06F 2009/4557; G06F 2221/2141
See application file for complete search history.

(56) References Cited

U.S. PATENT DOCUMENTS

| | | | |
|---|---|---|---|
| 2002/0067823 A1* | 6/2002 | Walker | H04M 3/428 379/266.01 |
| 2003/0051037 A1* | 3/2003 | Sundaram | H04L 12/66 709/227 |
| 2005/0008141 A1* | 1/2005 | Kortum | H04M 3/523 379/266.06 |
| 2006/0209797 A1* | 9/2006 | Anisimov | H04Q 3/64 370/352 |
| 2006/0218560 A1* | 9/2006 | Dadiomov | G06F 9/546 719/314 |
| 2007/0071223 A1* | 3/2007 | Lee | H04M 3/48 379/265.02 |
| 2008/0317058 A1* | 12/2008 | Williams | H04M 3/5238 370/417 |
| 2009/0080641 A1* | 3/2009 | Fitzgerald | H04M 3/493 379/265.11 |
| 2010/0054431 A1* | 3/2010 | Jaiswal | H04M 3/5183 379/88.04 |
| 2010/0210245 A1* | 8/2010 | Kim | H04W 4/16 455/412.1 |
| 2011/0125894 A1* | 5/2011 | Anderson | H04L 63/0807 718/1 |
| 2013/0036427 A1* | 2/2013 | Chen | G06F 9/546 719/312 |

\* cited by examiner

```
<Response>
  <Say>
    Please hold, a customer service representative will be with you shortly
  </Say>
  <Enqueue
      action="after_verb_exit.php"
      method="POST"
      waitUrl="hold_music.php"
      waitUrlMethod="GET">
      queue_name
  </Enqueue>
</Response>
```

FIGURE 4

```
<Response>
  <Dial>
    <Queue>queue_name</Queue>
  </Dial>
</Response>
```

FIGURE 8

SYSTEM AND METHOD FOR QUEUING A COMMUNICATION SESSION

CROSS-REFERENCE TO RELATED APPLICATIONS

This application is a continuation of U.S. patent application Ser. No. 18/075,985, filed 6 Dec. 2022, which is a continuation of U.S. patent application Ser. No. 16/413,991, filed 16 May 2019, which is a continuation of U.S. patent application Ser. No. 14/966,987, filed 11 Dec. 2015, which is a continuation of U.S. patent application Ser. No. 13/921,941, filed 19 Jun. 2013, which claims the benefit of U.S. Provisional Application Ser. No. 61/661,730, filed on 19 Jun. 2012, all of which are incorporated in their entireties by this reference.

TECHNICAL FIELD

This invention relates generally to the telephony field, and more specifically to a new and useful system and method for queuing a communication session in the telephony field.

BACKGROUND

In recent years, telephony applications have seen advancement due in part to internet based interfaces for telephony applications. The application of internet-based technologies in telephony communication has dramatically expanded the possibilities for telephony applications. Voice or telephony based calls are often limited by the fact that often a user is on one end of the call. In many cases, the resources to support these callers, such as customer service representatives, cannot be dynamically scaled to meet demand. As a result, telephony applications place callers in a holding pattern with the familiar looping music and canned messages. Waiting to leave the holding pattern is an annoyance to the caller, and the bad user experience reflects poorly upon the operators of the telephony application. Additionally, a generic waiting experience will not be suitable for all applications using a telephony platform that supports a wide variety of applications. Some PBX solutions provide basic static customization of music and announcements, but fail to provide flexibility use the queue. Thus, there is a need in the telephony field to create a new and useful system and method for queuing a communication session. This invention provides such a new and useful system and method.

BRIEF DESCRIPTION OF THE FIGURES

FIG. 4 is a exemplary request to enqueue a communication session;

FIG. 8 is an exemplary request to dial a queue;

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
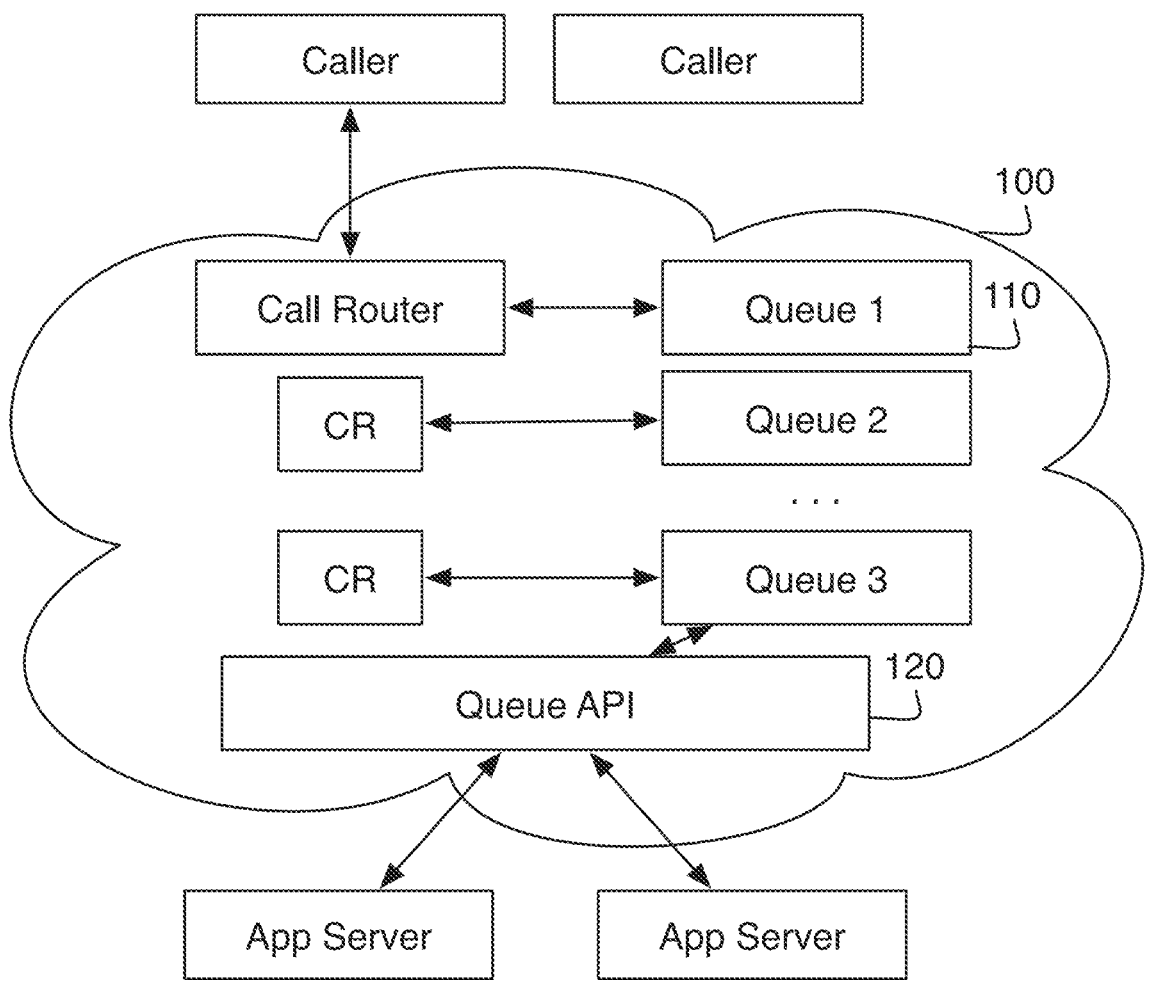
FIG. 1 is a schematic representation of a system of a preferred embodiment.

As shown in FIG. 1, a system for queuing a communication session of a preferred embodiment includes a multi-tenant communication platform 100, a queue management resource 110, and an API 120 with queue targeted interfaces. The system functions to enable programmatic and persistent queue resources. The system provides a platform tool wherein concurrent communication sessions can be simply managed while enabling advanced interaction capabilities. When implemented along with synchronous communication (e.g., telephone calls, video chats, screen-sharing, etc.), the system can be used as a tool for "call waiting". The system may additionally or alternatively be implemented for programmatic control of a queue for limited resources such as specialized processors, human facilitated processes, manufacturing tools, limited access resources, and/or any suitable resource limited component. The system preferably enables applications to simply direct inbound calls to a queue of their selection without implementing highly specialized queue application logic. The system is preferably provided to developers as a resource primitive that simplifies queue interactions and enables users of the platform (e.g., telephony application developers) to flexibly design customized and dynamic interactions. The system further functions to enable queues to be customized and interacted with dynamically and on the fly. Rich interactions and highly customized wait experiences can be generated by wait-state applications. When in the queue, the experience can be specifically tailored for the user through customized applications. Once an application is ready to connect a caller, a communication session can be easily popped off the queue and, using application instructions or an API, the communication session is directed to the appropriate place.

In an exemplary implementation, the system allows accounts or different applications to establish various call queues. The call queues can be for any suitable resource. In many cases, the call queue will be for a connection to an available agent (e.g., customer service representative). In other cases, the call queue could be to a limited resource such as a processing server that provides some unique service such as image processing. Communication sessions can preferably be enqueued during an active communication (e.g., an entity is concurrently participating in a live communication session) or in preparation for an eventually active communication session (e.g., a proxy for an upcoming call is enqueued and a live communication session is not active while waiting in the queue). A communication session may be enqueued in response to an API request and/or an instruction of an application. Any suitable number of queue resources can be generated for an account, and the platform can enable any suitable number of accounts to maintain queue resources. For example, an account on the platform may use the platform to provide a customer service phone system. There may be three call queues that are used for three different regions of customer support. Simultaneously, a second account may use a different queue setup to support a different application. The queues of the preferred embodiment are additionally configured for application execution during various states of waiting in the queue. Different applications, instructions, media resources or other resources can be set to be executed/played for a communication session for a particular state in the call queue. These various queue-state applications (as they may be generally referred) enable developers and account managers to customize the call queue experience.

The communication platform 100 of the preferred embodiment functions to provide a base service that participates in and/or facilitates communication with at least one endpoint. The communication platform can provide a wide variety of services. The communication platform can be a network provider to a collection of endpoints. The communication platform can alternatively include a plurality of call routers such that the communication platform 100 routes calls to various endpoints and/or services according to some configured logic. Preferably, the communication platform 100 facilitates executing communication applications. Communication applications are preferably uniquely configured by developers to provide a wide variety of different solutions such as implementing call trees, conference calls, customer service call systems, automated phone message service, voicemail, programmatic messaging/notifications, or any suitable application. The communication platform 100 is preferably multi-medium and multitenant. The multi-medium aspect of the communication platform 100 can be defined as a communication platform that facilitates communication over multiple forms of communication. The forms of communication can include PSTN, SIP, SMS, MMS, WebRTC, voice chat, video chat, screen-sharing sessions, IP based messaging, and/or other forms of communication. The communication platform 100 is preferably multitenant in the sense that multiple users, accounts, or entities share resources of the communication platform. The accounts preferably use account authentication practices when working with the application during graphical user interface configuration, API interactions, and/or during other suitable stages of account management. Accounts can further include sub-accounts or any suitable segmentation of application control and operation. The queues of an account are preferably independent from other queues and furthermore other accounts. In some variations, platform level queues may be used to manage account queues to provided resources of the communication platform. The communication platform is preferably a cloud service operating on a distributed computing system, but may alternatively be a computer cluster, an on-premise installation, or on any suitable computing infrastructure. The communication platform operates substantially similar to the communication platform described in U.S. Pat. No. 8,306,021, issued 2 Apr. 2009, which is hereby incorporated in its entirety by this reference. The communication platform may alternatively be any suitable network accessible platform.

The queue management resource 110 functions to control and alter the state of queue resources. The queue management resource 110 is preferably capable of instantiating, managing, and deleting a queue resource. When an item is instructed to be enqueued and a queue does not exist within the scope of that queue (e.g., within an account, sub-account, platform, etc.), the queue management resource preferably creates a queue resource and adds the enqueued item to the queue. Multiple queues may additionally be created within any given scope. Queues can preferably be specified by including a queue identifier in an enqueue request. An identifier for a non-existent queue preferably results in a queue with the specified queue identifier.

The items added to a queue are preferably communication sessions. The enqueued communication sessions can be added through any suitable process and do not have to originate from the same source. Some communication sessions may be added programmatically through the API, while some may be active communication sessions that transitioned to the queue to await the limited resource. An enqueued communication session can have at least two different states or modes of operation: an active state and an inactive state. The enqueued communication session may be an active communication session with a live participant on at least one endpoint of the communication. A wait-state application (e.g., queue-state application executed while waiting in the queue) will preferably execute and play audio or perform text-to-speech conversion or otherwise engage the connected endpoint as the caller waits. In another variation, the communication session is in an inactive state. An inactive communication session is preferably a proxy for a communication session. The proxy for a communication session is preferably not a live connection, but represents some entity or action that will occur upon dequeuing. The enqueued inactive communication session preferably includes a parameter specifying a communication endpoint that should be connected upon dequeuing. For example, an inactive communication session may be enqueued in response to a communication application of a received SMS message or in response to an API request. In this example, someone can get in a call waiting line and be connected when it's the entity's turn. A communication session can additionally transition between inactive and active. The queue is preferably persistent such that state or place of a communication session in the queue is maintained during changes in state of a communication session. For example, once in line, a caller can hangup (e.g., transition from active to inactive), and the queue will maintain the communication session and take appropriate action to connect the caller when the session is dequeued. A communication session proxy item is progressed through the queue, and upon dequeuing, the caller is connected.

The enqueued communication sessions can additionally be queried and/or manipulated through the API 120. Additionally, a queued communication (active, inactive or an alternative state), may be configured with various queue-state applications. Queue-state applications are preferably executable instructions, services, playable media, and the like that are set to be initiated and performed during particular stages of the queue. A queue-state application is preferably individually executed for a single communication session. Queue-state applications can include at least the variations of an added-state application, a wait-state application, and/or an action state application. There may alternatively be similar applications that execute in the background or interject into the communication sessions based on overall state of the queue or an account. An added-state application is preferably invoked before or alternatively directly after a communication session is added to a queue. The added-state application can be used to announce to the user that they have been added to a queue. A wait-state application is preferably invoked while the communication session is waiting. The wait-state application is preferably invoked repeatedly. Alternatively, the wait-state application may be invoked when updating position or in response to any suitable event. Each time the wait-state application is invoked, updated queue statistics (e.g., estimated wait time, place in the queue, etc.) may be supplied to the application.

For example, the wait-state application may include text-to-speech instructions to read to the current user their place in line and then play music for one minute before ending. When this application is looped, the caller is updated with their wait position roughly every minute. The wait-state application may additionally be invoked for non-active communication sessions. Since there is no active endpoint connected in this variation, the wait-state application functions as a background script. For example, the wait-state application may be used to send an SMS message when the user's place in the queue is updated. The action-state application (i.e., an application for the newly dequeued-state) is preferably invoked in response to the communication session being dequeued. For example, the action-state application may play a message notifying a listener that the call is being connected. The action-state application may be configured or defined when a communication session is queued, when the queue is created, or when a dequeuing agent makes a dequeue request. A post-action application can be specified to be transferred control logic control after a dequeuer agent (e.g., a customer care representative) hangs up. Similarly, the control logic can be transferred to an original application that made the original enqueue request. For example, an initial application may include an enqueue instruction followed by instructions to receive customer feedback. A caller is first queued, then an agent helps the caller, and after the agent hangs up, the caller is transferred back to the original application so that the customer feedback instructions can execute. Any alternative types of applications may be configured or specified for the queue or for interactions with the queue.

The queue management resource 110 additionally includes operational configuration to manage the procession of communication sessions in a queue resource. The queue is preferably managed to enable first in first out queue behavior. The queue can alternatively enforce first in last out queue behavior. The queue could also use various prioritization policies to enable particular queued items to be move through the queue faster or slower than other items. The queue management resource preferably selects the item to dequeue, updating remaining items in the queue to reflect their new position, and add an item to the queue. The queue management resource is preferably responsive to the queue targeted API calls and particular application instructions.

The API 120 with queue targeted interfaces functions to enable programmatic interaction with queued items. An API 120 is preferably a REST API. The API preferably works according to an HTTP request and response model. HTTP requests (or any suitable request communication) to the communication platform 100 and/or the queue management resource 110 preferably observe the principles of a RESTful design. RESTful is understood in this document to describe a Representational State Transfer architecture as is known in the art. The RESTful HTTP requests are preferably stateless. The components of the communication platform and/or the interface service preferably do not need to remember or store previous communications to be aware of the state. Additionally or alternatively, the API 120 may be used or accessed through application instructions. The API 120 preferably works around a queue instance resource that allows users to query and manage the state of individual call queues. Call queues can be referenced using a queue identifier. When using a REST API, a particular queue may be referenced by a resource URI with the following pattern: "/2010-04-01/Accounts/{AccountSid}/Queues/{QueueSid}". A queue resource may include various properties such as an identifier, a friendly name (i.e., a user-provided string that identifies the queue), a current size metric, maximum size, average wait time, and/or any suitable property. A queue resource can additionally include a members sub-resource. The members sub-resource is preferably a list of communication sessions currently in the queue. A member instance is preferably the construct or proxy for an enqueued communication session. A member resource can include properties such as data enqueued, wait time, position, queue-state application configuration, and/or any suitable properties. The API 120 is preferably used to query information of the queue resources, but may additionally be used to manipulate or modify aspects of the queue. When the queue resources are used in application instructions, a call router or other suitable communication processor can add, remove, connect, and/or manage members of the queue (i.e., communication sessions of the queue). In one implementation, there is an enqueue instruction, which can be used to add a communication session as a member resource. Attributes of the enqueue instruction can include an action-state application configuration, a wait-state application configuration, other queue-state application configuration, and/or any suitable attribute. The name of the queue may additionally be specified to identify which queue is to be used. If no queue is specified, a default queue can be used. A queue-state application configuration is preferably an absolute or relative URI, but the configuration can alternatively be application logic, an application data file, or any suitable application configuration. Queue-state applications may be limited in their functionality. For example, a wait-state application may be limited to play, say, pause, hangup, redirect, leave, and gather instructions during a telephony communication. Accessing queued members preferably involves using a queue instruction. The queue instruction is preferably specified within a dial instruction. When invoking a queue instruction within a dial instruction, the queue is accessed and the first enqueued communication session is connected. If the queue is empty, one variation may include the dialing entity or agent waiting until a new communication session joins the queue. Alternatively, an error or other suitable response may be returned if the queue is empty or does not exist. An application configuration can be configured with the queue instruction to specify an application to be invoked directly preceding, during, or directly after dequeuing a communication session.

2. Method for Queuing a Communication Session

Figure 2:
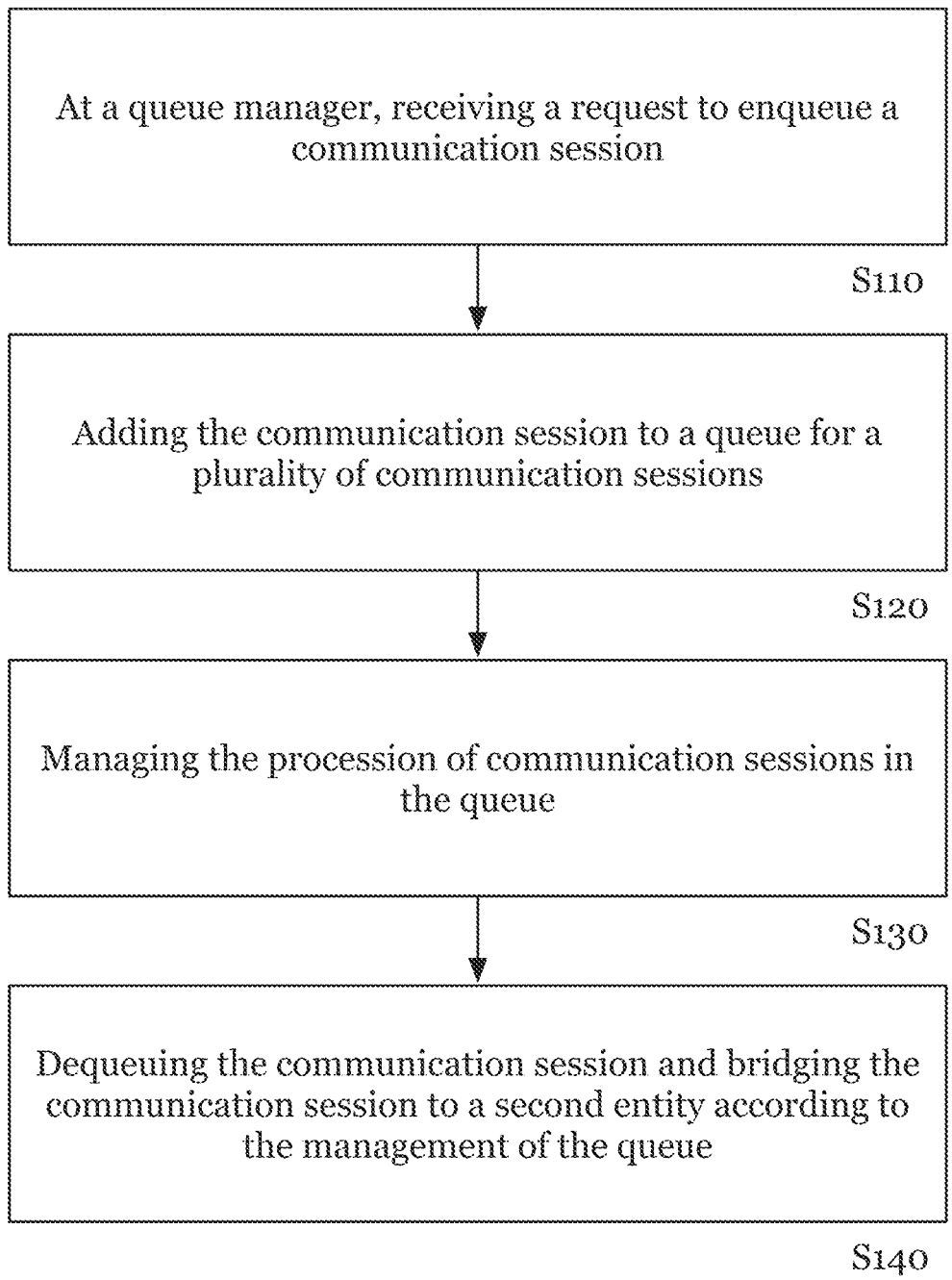
FIG. 2 is a flowchart representation of a first preferred embodiment of the invention.
Figure 3A:
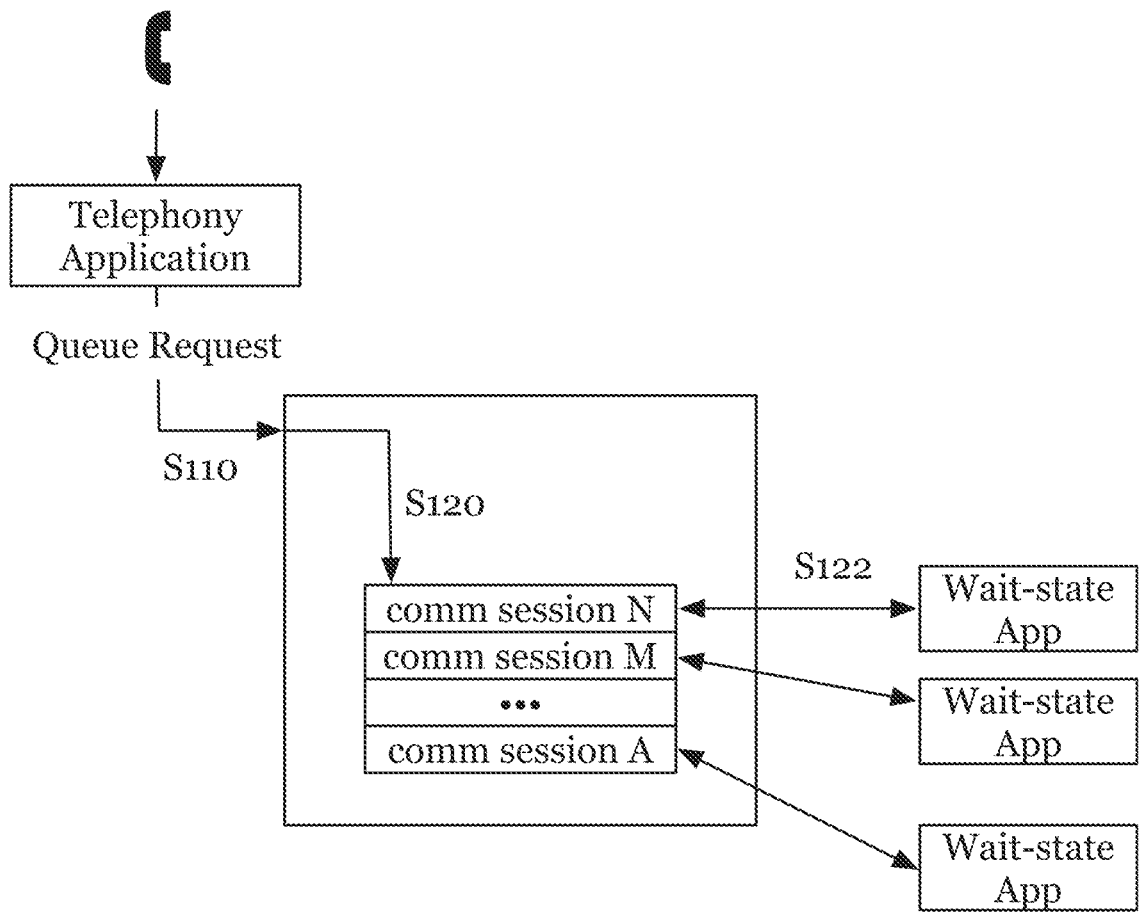
FIGS. 3A and 3B are schematic representations of a preferred embodiment of the invention.
Figure 3B:
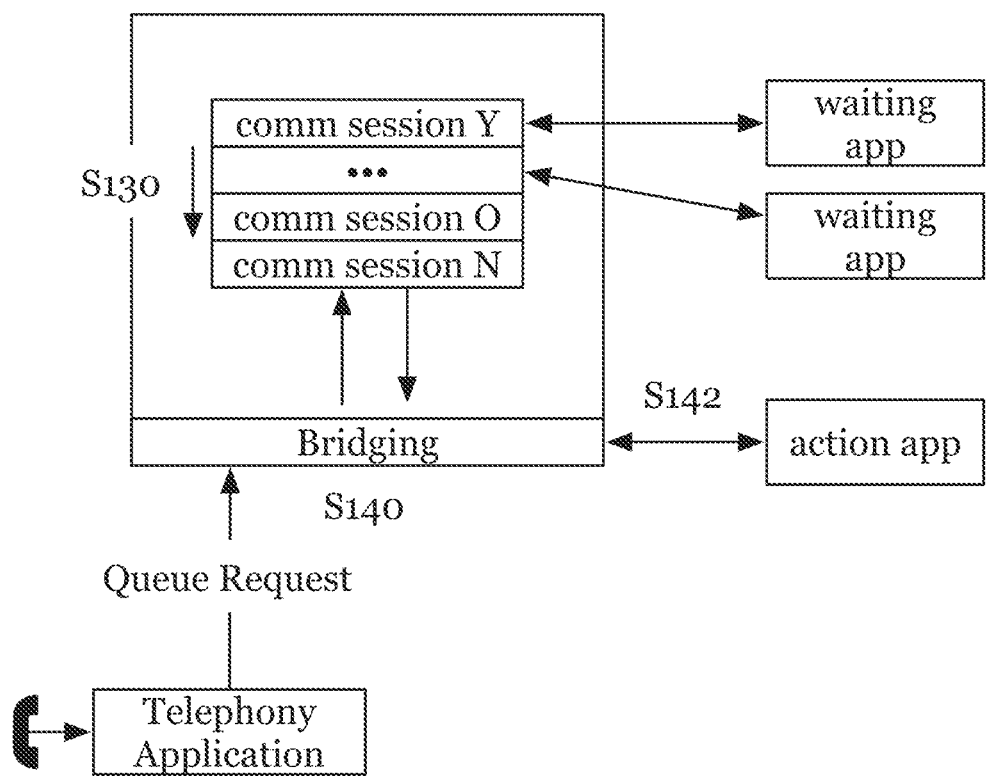

As shown in FIG. 2, a method for queuing a communication session of a preferred embodiment includes at a queue manager receiving a request to enqueue a communication session S110, adding the communication session to a queue for a plurality of communication sessions S120, managing the procession of communication sessions in the queue S130, and dequeuing the communication session and bridging the communication session to a second entity according to the management of the queue S140. As shown in FIGS. 3A and 3B, the method may additionally include transferring control of the communication session to a wait-state application while the communication session is in the queue S122 and/or transferring control of a communication session to an action-state application in response to dequeuing the communication session S142. The method functions to simplify management of concurrent communication sessions of an application. The queue operations are preferably atomic and transactionally safe, which can simplify the development process for developers of applications where such concurrent operations are common (e.g., telephony applications). In telephony applications, the method preferably enables application developers to simply customize the wait state experience for application-facing users. Applied to a telephony platform, the method functions to enable customized "holding" experiences for various telephony applications. The method is preferably implemented by a system substantially similar to the one described above but any suitable system may alternatively implement the method. The method is preferably used in combination with a communication platform such as one substantially similar to the telephony platform described in published U.S. Pat. No. 8,306,021, issued 2 Apr. 2009, titled "SYSTEM AND METHOD FOR PROCESSING TELEPHONY SESSIONS", but the communication platform may alternatively be any suitable communication platform. In a telephony platform or an alternative suitable platform, a multitenant and scalable resource may facilitate the operation of a plurality of queue managers. In such an embodiment, the telephony platform can preferably enable the benefits of the method for a plurality of different applications/users on the platform. The method is preferably used with voice/telephony-based applications. Voice/telephony-based applications can include synchronous communication sessions over PSTN, SIP, or other suitable voice protocols. The method may additionally or alternatively be applied to other communication protocols such as SMS, MMS, IP messaging, video, screen sharing, and/or any suitable communication protocol. In many exemplary situations, the queue of the method is used by a telephony application when a resource (e.g., a human customer service representative) is unavailable, but the queue may be used for any suitable purpose such as for limited hardware/software resources, creating transactionally safe operations, and/or any suitable application of a queue.

Step S110, which recites at a queue manager receiving a request to enqueue a communication session, functions to obtain a notification from an entity to add a communication session to a queue. The request is preferably communicated from a telephony application. More preferably, the request is initiated by a telephony application instruction such as in the example request shown in FIG. 4. The communication session is preferably an active telephony/voice call, but may alternatively be a video communication session, a screen sharing session, multi-media session, a gaming session, or any suitable communication session. The communication session preferably represents a currently active or a potentially active communication channel to an entity/user. In one example, a caller may be active on one leg of the communication session while being added to a queue. The application instructions directing logic of the communication session will preferably include an "enqueue" instruction or the equivalent instruction(s). Upon encountering the "enqueue" instruction, the communication instruction is preferably enqueued. The communication session may alternatively not include a live caller connected to the communication session and/or may be a proxy for a communication session—the communication session to enqueue may be an inactive communication session. A proxy communication session may have been programmatically queued, initiated through a asynchronous communication channel (e.g., SMS), be an active call that became inactive during the queuing process, or not have a connected live caller for any suitable reason. The request preferably specifies the account or scope of the queue. In an exemplary use case, the request specifies an account identifier and optionally an explicit queue identifier. Within a multitenant environment, the identifiers of the queue are used to coordinate management of multiple queues simultaneously.

Preferably, the request to enqueue a communication session specifies various queuing parameters that define the queuing behavior for that communication session. The queuing parameters may include a wait-state application, an action-state application, a queue identifier, a time-out, queue error application, and/or any suitable queuing parameter. The wait-state application, the action-state applications, and/or any suitable application parameters are preferably universal resource indicators (URIs) that reference an internet accessible resource with application instructions. The wait-state, action-state, or other applications may alternatively be any suitable reference to a queue-state application. Alternatively, queuing parameters may be specified to define queue behavior for an application, a user-account, a platform, or any suitable entity. As mentioned, the request may specify a queue identifier. The queue identifier may be for an application-based namespace or a global namespace. A default queue for a telephony application or account may be used if a queue identifier is not specified. In other words, the lack of a specified queue identifier within an account may be an implicit identifier for the default queue of the account. If a queue does not yet exist, one is preferably created. If the intended queue is unavailable due to capacity or other limitations, a new queue may be created, an error response taken, or any suitable action may be taken.

S120, adding the communication session to a queue of a plurality of communication sessions, functions to appropriately add the communication session to a queue. The queue is preferably a prioritized or ordered list of communication sessions (i.e., queue members) ordered by priority, and the recently added communication session is preferably added to the end of the communication queue. Depending on the type of queue management policy in place, the communication session may alternatively be placed in any suitable location in the queue. The entities/members in the queue are preferably persistent and may be decoupled from any associated active communication session. In other words, the communication session stored in the queue may be a proxy representative for a prior and/or subsequent communication session. In one exemplary application described in more detail below, a caller may hang-up once they are placed on hold, but their place in the queue is maintained despite the fact that the user no longer has an active communication session. In other words, an active communication session can become inactive while in the queue, and an inactive communication session can become active. An inactive communication session preferably becomes active in various ways. In one variation, the communication session becomes active by the communication platform calling out to the original endpoint of the enqueued communication session. In a second variation, the communication platform can reestablish an active communication session for an incoming communication to the original endpoint made by the endpoint associated with the enqueued communication session. For example, endpoint A calls service B. Service B queues the caller of endpoint A and plays some waiting music. The caller of endpoint A may hang up, and the place of endpoint A is managed in the queue as if the caller was still actively listening to the waiting music. Endpoint A can then call service B a second time, and the communication platform identifies that a communication session is already established between endpoint A and service B, and will reconnect the caller to the enqueued communication session. When added to the queue, the queue manager may additionally begin accounting for the communication session when measuring queue analytics. The queue analytics preferably includes statistics on overall queue properties (e.g., average wait time, number of queued communication sessions, etc.) and individual communication session queue properties (e.g., total wait time, number in line, etc.). The queue analytics is fed back to the wait state application to enable the wait state application to feed back queue information to the enqueued user.

Figure 5:
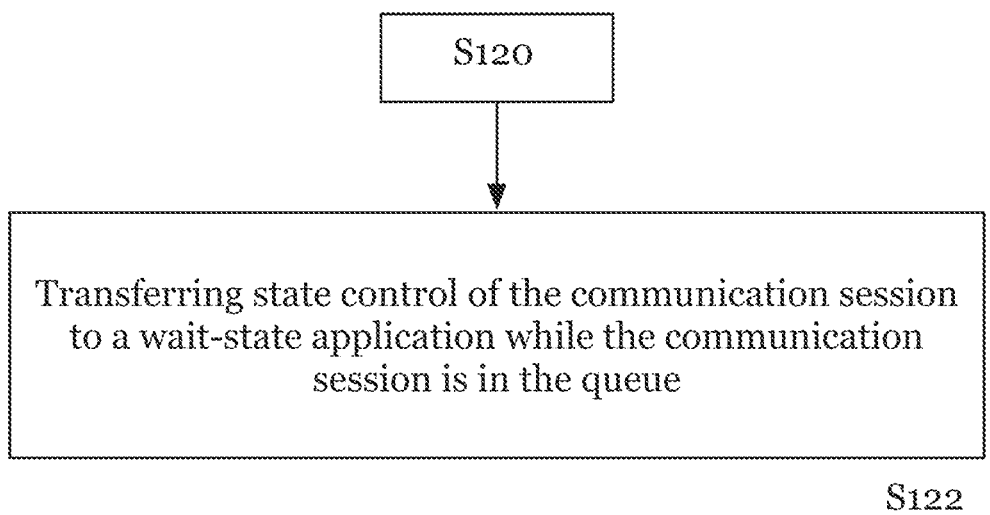
FIG. 5 is a flowchart depicting a variation of the first preferred method for queuing a communication session.
Figure 6:
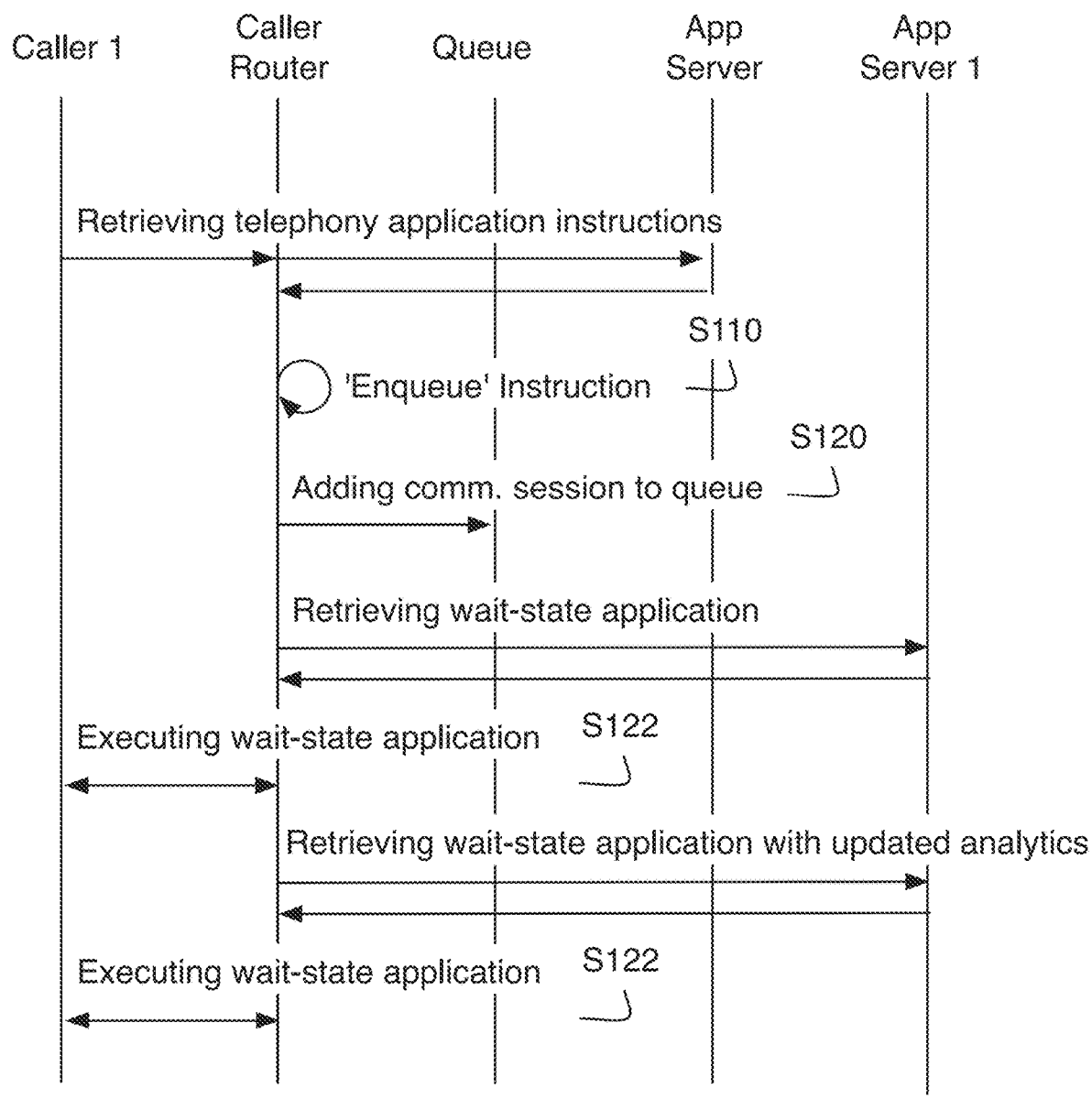
FIG. 6 is a communication flowchart representation of a communication session being enqueued.
Figure 7:
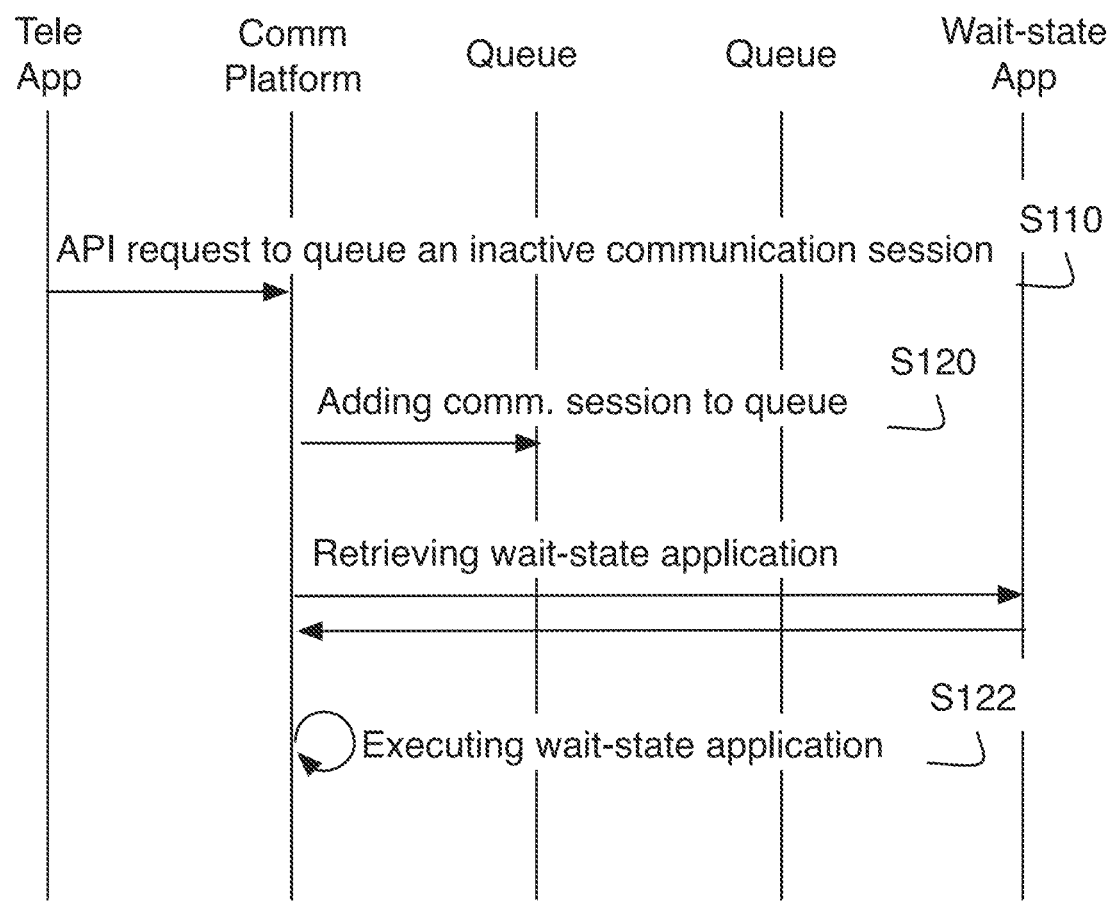
FIG. 7 is a communication flowchart representation of an inactive communication session being enqueued.

Additionally, Step S120 preferably includes transferring control of the communication session to a wait-state application while the communication session is in the queue as shown in FIG. 5, which functions to manage control logic for the communication session while in the queue with a customizable application. As described above, the wait-state application is preferably specified in the queuing request. The wait-state application is preferably created or selected by the application developer, and may be designed to perform any arbitrarily complex application logic. The wait-state application may be a simple application such as a looping audio file, or may be a complex interactive application that may require user input, transfer control to other applications, or perform any arbitrarily complex logic. The wait-state application is preferably an internet accessible resource including instructions such as a telephony markup language document. The telephony communication platform implementing the method or any suitable communication platform preferably facilitates interpreting and executing the control logic of the wait-state application. Accessing the wait-state application (and similarly for other queue-state applications) preferably includes using HTTP to access the URI of the queue-state application. The queue-state applications can reside on outside network accessible resources. The returned document is preferably a document of telephony application instructions formatted into a markup language. The wait-state application is preferably implemented with a looping behavior in that the control logic may be repeated as long as the communication session is enqueued as shown in FIG. 6. More specifically, an HTTP request to the wait-state application URI is preferably initiated each time processing of the wait-state application completes instruction execution. Since the response of the server hosting the queue-state application can dynamically change for different requests, the wait-state application can be dynamically generated to target the current context of the communication session. Current queue analytics may additionally be provided as inputs to the wait-state application (e.g., as HTTP query parameters). In one exemplary application of the queue analytics, input would be communicating a message to the user informing the user of their position in the queue. While the wait-state application can be used for controlling an active communication session, the wait-state application can additionally be used for an inactive communication session as shown in FIG. 7. Additionally or alternatively, other applications may be transferred control of the communication session during other stages of the queue, such as when first joining the queue, when next in line to be dequeued, when a particular queue condition is met, or at any suitable time.

In a variation of a preferred embodiment, the method may include handling an error response after a failure of adding the communication session to a queue, which functions to recover from the situation where a communication session cannot be added to a queue. A communication session may not be able to be added to a queue if the queue is full, if the wait time is beyond a wait limit, or for any suitable reason or error. A failure state application is preferably transferred control of the communication session as part of the error response. A failure state application is preferably configured in a manner substantially similar to the wait-state application and action state application. The failure application is preferably transferred control of the communication session when an error response is received after attempting to add the communication session to a queue. Alternatively or additionally, the failure state application may be invoked for an error at any suitable time such as an error when dequeuing a communication session. The failure state application may provide any suitable application logic for gracefully handling an error. The type of error and any suitable error information may be passed to the failure state application. The failure state application can preferably elect to place the communication session in a second queue. A second queue may be pre-existing or generated in response to the error.

S130, which recites managing the procession of communication sessions in the queue, functions to update the queue based on specified or default queue heuristics. The management of the queue preferably includes adding new communication sessions to the appropriate location, updating priority/order of communication sessions, and dequeuing communication sessions. The queue is preferably configured to apply a standardized queuing heuristic. One exemplary preferred queuing policy would be a "last in, last out" policy, where queued communication sessions are dequeued in the order they are queued. However, the dequeuing and prioritization of sessions may follow any suitable heuristic. Other queuing heuristics may include "first in, last out", a priority-based policy, random selection, or any suitable heuristic to determine the servicing of the queue. The queuing heuristic may be based on properties of the queued communication sessions such as associated account IDs, phone numbers, or any suitable parameter of the communication sessions. The queue manager may additionally enable customization of queue behavior through specifying a parameter in the queue request or through a queue API. As mentioned, the queue manager may additionally include an interface to enable dynamic queue management. The queue manager preferably has an application programming interface (API) so that an outside party may make changes to the queue and/or query status of the queue. The queue API preferably exposes various API resources, service calls, or other mechanisms that are responsive to requests to add or remove communication sessions from a queue and to requests for analytics of the call queue. The queue API may be used to retrieve queue statistics/analytics, the status of a communication session in the queue, modify the ordering of communication sessions in the queue, add or remove a communication session, alter the behavior of the queue, delete or create queues, and/or perform any suitable action. In providing a queue API interface, the method functions to enable API calls that are responsive to managing members of a queue resource and querying information of the queue. Managing members of the queue preferably includes calls that add, remove, and/or reposition communication sessions in a queue. Querying information of a queue preferably includes accessing overall queue analytics, queue member specific analytics, and/or other forms of information about the queue. The queues are preferably presented as REST API resources. For example, a queue named Foo of account Bar may be targeted in an API request through an API call to "/2010-04-01/Accounts/Bar/Queues/Foo". By issuing an HTTP GET to this queue resource, information about the queue can be retrieved. By issuing an HTTP POST to this resource, properties such as max size, queue name, and other attributes can be changed. Similarly, members of the Foo queue resource (i.e., the enqueued communication sessions) can be targeted with API calls to "/2010-04-01/Accounts/Bar/Queues/Foo/Members/

". A list of members can be retrieved or specific communication sessions can be targeted by appending a communication session id or descriptor (e.g., front or back).

S140, which recites dequeuing the communication session and bridging the communication session to a second entity according to the management of the queue, functions to connect the communication session with another party when the communication session is selected to be dequeued. Phrased another way, block S140 functions to establish communication of an enqueued communication session with a second entity. Bridging the communication session to a second entity can include establishing a connection between a second endpoint and the endpoint of the communication session. If the communication session is active this may simple include merging the enqueued communication session with a second communication session, where the second communication session is one established between the second entity and at least the communication platform. If the communication session is inactive, bridging may include calling out or re-establishing an active communication session with the original caller (i.e., the user associated with the enqueued communication session), and then subsequently merging the communication session with a second communication session. The second entity is in many exemplary situations associated with a limited resource that necessitated the need of the queue. For example, the second entity may be a voice connection to a customer representative (i.e., the dequeuer) for whom an initial caller had been waiting. The second entity may alternatively be an application or device with less capacity than demand. The dequeuing of the communication session may be initiated by the second entity, but a request to dequeue a communication session may alternatively be made by any suitable party. In one embodiment, the second entity is a telephony application that dials the queue to initiate bridging with the next communication session in the queue. As shown in FIG. 8, telephony application instructions can be used to instruct an agent or second entity to call a queue, wherein the queue is specified by a queue identifier. Alternatively, a communication session may be dequeued in response to an API call to the queue or from an intermediary application/party messaging the queue. In one variation, the API call to dequeue may be directed at the communication automatically session selected by the call queue (e.g., the communication first in line), but the API call may alternatively be directed at a specific communication session contained in the queue. The API call is preferably used in transferring the communication session to an application. The transferred application is preferably referenced by a URI in a manner similar to those described above. The application preferably includes telephony instructions that instruct a call router on controlling state and engaging a connected user. The transferred application can perform any suitable logic such as call out to an agent and bridging a communication session between the queued entity and the agent. The application could alternatively be any suitable application logic. The queue is preferably configured to be responsive to various forms of dequeueing, such as the variation of a dequeuing agent calling into the queue and bridging the two entities or the variation of transferring the communication session to an second application. The dequeued communication session is preferably one of the set of enqueued communication sessions that is next for queue servicing. Determining the next communication session is based on the procession of communication sessions in block S130. For example, if the queue is a first in first out queue, then the dequeued communication session is the communication queue that has been in the queue for the longest amount of time.

Figure 9:
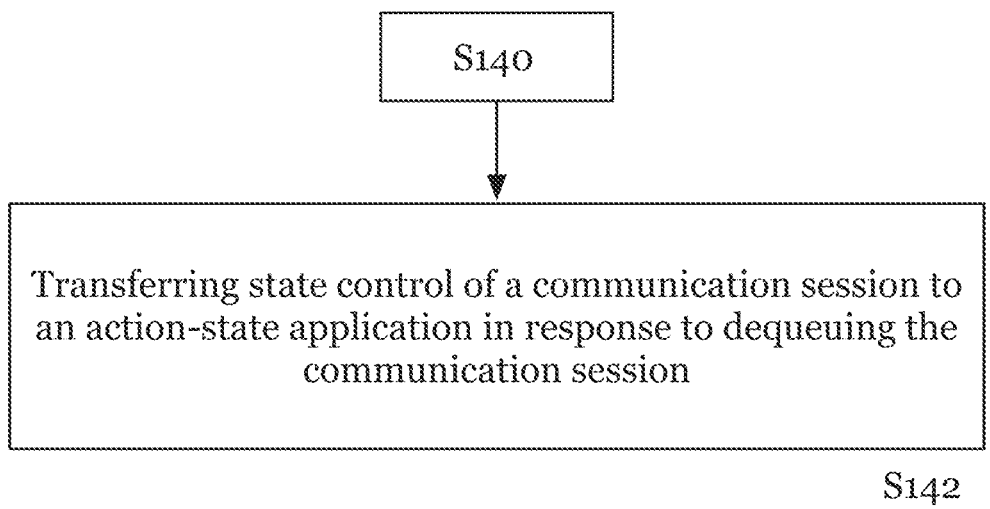
FIG. 9 is a flowchart depicting another variation of the first preferred method for queuing a communication session.
Figure 10:
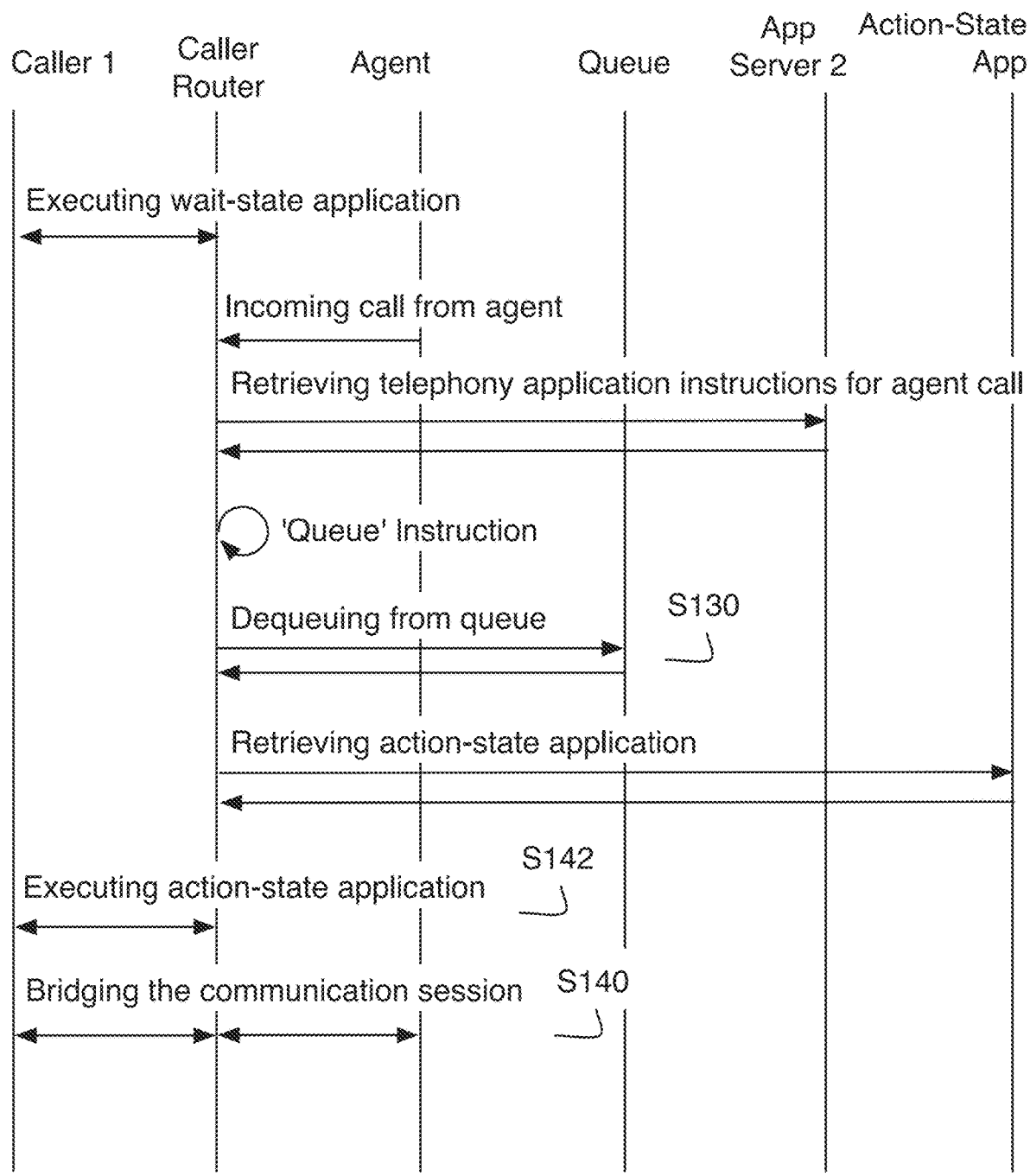
FIG. 10 is a communication flowchart representation of dequeuing a communication session.

Additionally, step S140 preferably includes transferring control of a communication session to an action-state application in response to dequeuing the communication session S142 as shown in FIG. 9, which functions to perform actions for the transition from the enqueued state to a state of being bridged with a second entity. The action-state application is preferably an application substantially similar to the wait-state application described above. The action-state application, however, is preferably selected or designed to facilitate the transition out of the queue. In one exemplary embodiment, the action-state application is designed to play the message, "Thank you for waiting. We are now connecting you" to the user connected to the communication session. In another exemplary embodiment, there may not be an active voice session for the dequeued communication session, and the action-state application may be designed to establish a voice connection with the user associated with the dequeued communication session before bridging the communication session with the second entity. The action-state application may alternatively be any suitable application. After completion of the action-state application, the selected communication session is preferably bridged with the second entity as described above and shown in FIG. 10.

The customizable queue of the preferred embodiment may be utilized be developers to create a wide variety of queue systems. As a first example application of a preferred embodiment, the method may be employed to enable a call waiting system where callers are not required to stay on the line. A caller can preferably communicate that they would like to hold a place in line. In one variation, the user may be placed in the line due to the control logic of a telephony application with which the user has a voice connection. Once a place in the line has been established, the user may hang up while the communication session remains queued in the persistent queue. In a second variation, the user may use an alternative form of communication to initiate getting in line. For example, the user may send a text message to a specified number, that number may be directly associated with the queue or may be associated with an application that enqueues a communication session on behalf of the user. Similarly, a communication session may be automatically enqueued without direct initiation of a user. This variation functions to illustrate how an active communication session does not need to exist prior to being enqueued. As an additional feature, while the communication session is enqueued, a wait-state application may facilitate a user establishing a connection to the enqueued communication session. The user may call a number that identifies the associated queued communication session, and connects the user with the communication session in the queue as if the user never left the holding state. Similarly, the user may send a message to a phone number and in response, receive a message indicating the wait time, position in line, and/or any suitable message. When the communication session is dequeued and there is no active connection to the queued communication session, the action-state application preferably establishes a connection with the intended user. So for a user that had hung up when placed on hold, the system preferably calls the user. After the caller has an active connection then the call is preferably bridged with the intended person or device.

In a second exemplary application of a preferred embodiment, the API of a queue is preferably used to dynamically alter the waiting experience of a user. A user may have been placed in a line waiting for the next available customer representative. While waiting for the customer representative, the user may listen to a message controlled by the wait-state application. The wait-state application may include an advertisement of a way to skip ahead in the line. For example, a user may receive queue priority by listening to an advertisement, answering a survey, agreeing to be charged a fee, or through any suitable action. In response to the action of the user, the wait-state application preferably uses the queue API to alter the ordering of the communication sessions in the queue so that the user will be dequeued sooner than if they had not performed that action.

A system for an alternative embodiment preferably implements the above methods in a computer-readable medium storing computer-readable instructions. The instructions are preferably executed by computer-executable components preferably integrated with a queue manager of a telephony/communication platform. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device. As mentioned above, the queue manager is preferably integrated with a telephony/communication platform. More preferably the queue manager is integrated into a cloud hosted communication platform. As part of a cloud computing infrastructure, a cluster of a queue managers preferably are preferably coordinated to manage the allocation and deallocation of queues, load balancing of communication sessions in the queues, and any suitable issues of managing a plurality of queues in a multitenant environment.

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
receiving, via an Application Programming Interface (API) call, a request to place a hold on a communication session associated with a device, the request including a wait-state application parameter that defines a queuing behavior of the communication session in one or more states of waiting in a communication queue;
adding the communication session to the communication queue; and
in response to adding the communication session to the communication queue, retrieving a wait-state application for the communication session based on the wait-state application parameter while the communication session remains in the communication queue.

2. The method of claim 1, wherein the request comprises a queue identifier associated with the communication queue, and wherein a communication session proxy is used to add the communication session to the communication queue, the communication session proxy being configured to queue the communication session without an active connection.

3. The method of claim 2, comprising:
in response to receiving the request to place a hold on the communication session associated with the device, adding the communication session to the communication queue based on the queue identifier.

4. The method of claim 1, comprising:
processing the communication queue in a first-in-first-out order.

5. The method of claim 1, wherein the request comprises a plurality of queuing parameters that correspond to one or more of the wait-state application, a queue identifier, a resource identifier, an action state application, a time-out duration, and a queue error application.

6. The method of claim 5, wherein the plurality of queuing parameters comprises Universal Resource Identifiers (URIs) that reference one or more internet-accessible resources with application instructions.

7. The method of claim 1, wherein the request comprises a stateless Hypertext Transfer Protocol (HTTP) request.

8. The method of claim 1, wherein the wait-state application is implemented with a looping behavior, comprising:
repeatedly executing a control logic associated with the wait-state application as long as the communication session remains in the communication queue.

9. The method of claim 1, comprising:
identifying current analytics associated with the communication queue; and
providing the current analytics as one or more inputs to the wait-state application.

10. The method of claim 1, comprising:
in response to adding the communication session to the communication queue, deactivating the communication session, the deactivated communication session comprising a communication endpoint to be connected upon reactivating the communication session associated with the device.

11. A system comprising:
one or more hardware processors; and
one or more computer-readable mediums storing instructions that, when executed by the one or more hardware processors, cause the system to perform operations comprising:
receiving, via an Application Programming Interface (API) call, a request to place a hold on a communication session associated with a device, the request including a wait-state application parameter that defines a queuing behavior of the communication session in one or more states of waiting in a communication queue;
adding the communication session to the communication queue; and
in response to adding the communication session to the communication queue, retrieving a wait-state application for the communication session based on the wait-state application parameter while the communication session remains in the communication queue.

12. The system of claim 11, wherein the request comprises a queue identifier associated with the communication queue, and wherein a communication session proxy is used to add the communication session to the communication queue, the communication session proxy being configured to queue the communication session without an active connection.

13. The system of claim 12, wherein the operations comprise:
in response to receiving the request to place a hold on the communication session associated with the device, adding the communication session to the communication queue based on the queue identifier.

14. The system of claim 11, wherein the operations comprise:
processing the communication queue in a first-in-first-out order.

15. The system of claim 11, wherein the request comprises a plurality of queuing parameters that correspond to one or more of the wait-state application, a queue identifier, a resource identifier, an action state application, a time-out duration, and a queue error application.

16. The system of claim 15, wherein the plurality of queuing parameters comprises Universal Resource Identifiers (URIs) that reference one or more internet-accessible resources with application instructions.

17. The system of claim 11, wherein the request comprises a stateless Hypertext Transfer Protocol (HTTP) request.

18. The system of claim 11, wherein the wait-state application is implemented with a looping behavior, and wherein the operations comprise:
repeatedly executing a control logic associated with the wait-state application as long as the communication session remains in the communication queue.

19. The system of claim 11, wherein the operations comprise:
identifying current analytics associated with the communication queue; and
providing the current analytics as one or more inputs to the wait-state application.

20. A non-transitory computer-readable medium storing instructions that, when executed by one or more computer processors of a communication platform, cause the communication platform to perform operations comprising:
receiving, via an Application Programming Interface (API) call, a request to place a hold on a communication session associated with a device, the request including a wait-state application parameter that defines a queuing behavior of the communication session in one or more states of waiting in a communication queue;
adding the communication session to the communication queue; and
in response to adding the communication session to the communication queue, retrieving a wait-state application for the communication session based on the wait-state application parameter while the communication session remains in the communication queue.

* * * * *